United States Patent [19]

Villemin et al.

[11] Patent Number: 4,793,232

[45] Date of Patent: Dec. 27, 1988

[54] CUTTING APPARATUS FOR SEPARATING HARD AND SOFT MATERIALS

[75] Inventors: Daniel Villemin, Chennevieres sur Marne; Paul Romand, Valence, both of France

[73] Assignees: Etablissements Arrive S.A., Saint Fulgent; Union Financiere pour le Developpement de l'Economie, Paris, both of France

[21] Appl. No.: 865,267

[22] Filed: May 20, 1986

[30] Foreign Application Priority Data

May 20, 1985 [FR] France ................. 85 08276

[51] Int. Cl.$^4$ .............................. B27B 33/14
[52] U.S. Cl. ........................ 83/788; 17/1 G; 17/46; 83/830
[58] Field of Search .............. 17/1 G, 46; 83/830, 83/831, 832; 403/56, 76, 122, 123, 127, 128, 358, 393, 396

[56] References Cited

U.S. PATENT DOCUMENTS

| 2,271,270 | 10/1940 | McLearn | 403/393 |
| 2,752,964 | 4/1953 | Prusinski | 83/830 |
| 4,422,216 | 12/1983 | Spötzl | 17/16 |

FOREIGN PATENT DOCUMENTS 170901 4/1955 Sweden ................. 403/56

Primary Examiner—Frank T. Yost
Assistant Examiner—Scott A. Smith
Attorney, Agent, or Firm—Herbert Dubno

[57] ABSTRACT

An apparatus for cutting a soft material, such as meat, from a hard material, such as bone, according to the invention has a chain formed of a succession of alternating cutting and coupling links extending along a longitudinal line. The cutting links are of generally polygonal cross-sectional shape and have corners forming longitudinally extending sharp cutting edges spaced a predetermined maximum transverse distance from the line. In addition the coupling links are of a predetermined maximum radial dimension from the line shorter than the distance such that the cutting edges project transversely beyond the coupling links and the cutting links are rotatable in the chain about the line. This chain is advanced in a longitudinal direction parallel to the line. Thus the cutting links will naturally pivot to lie flat on the hard material and slide therealong, neatly cutting along the hard/soft interface.

11 Claims, 2 Drawing Sheets

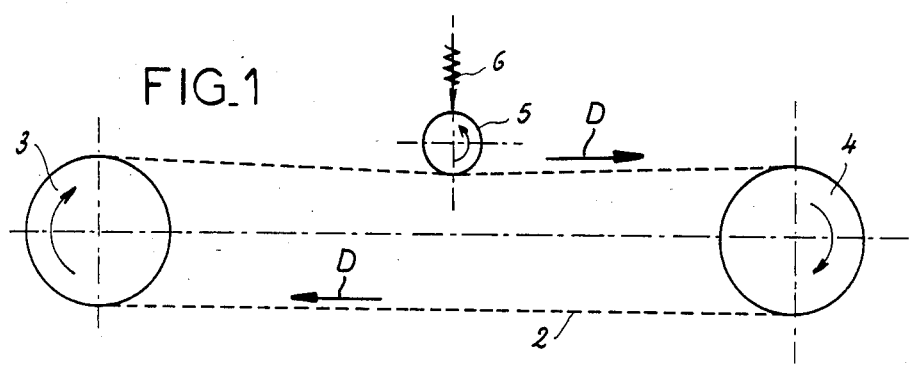
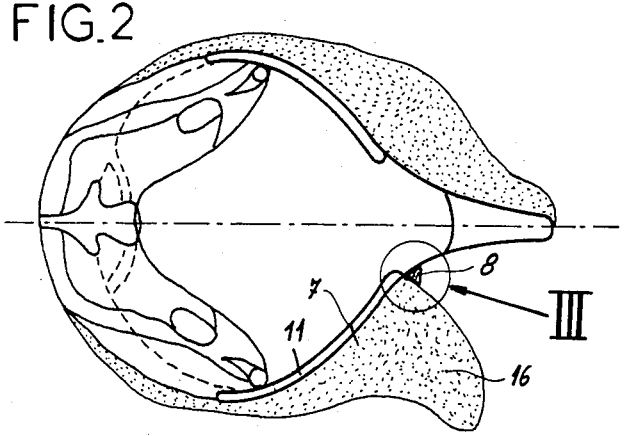
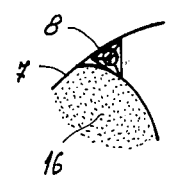
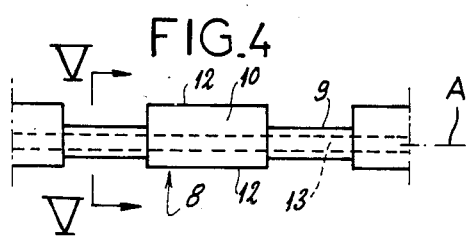
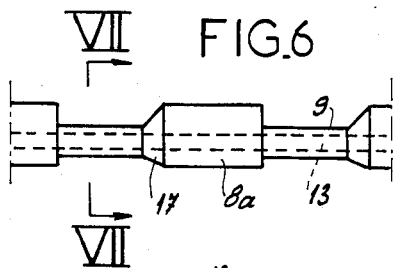
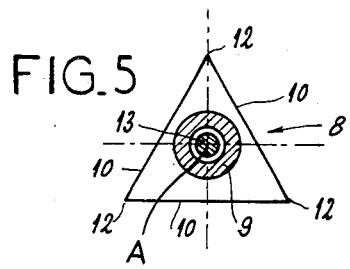
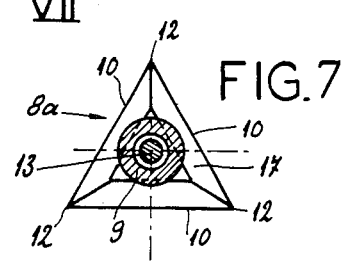

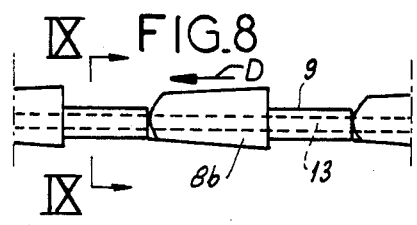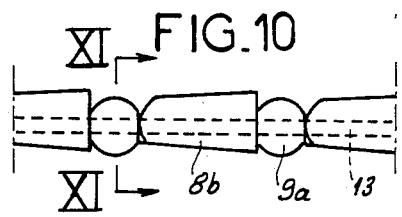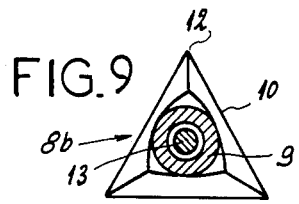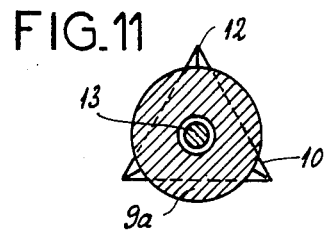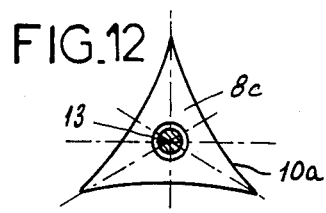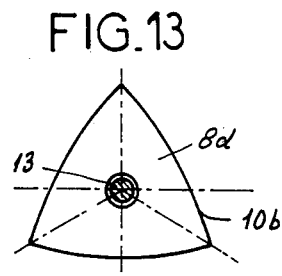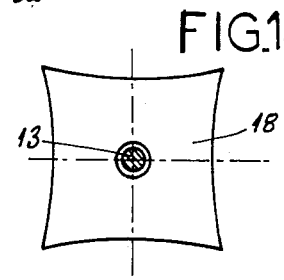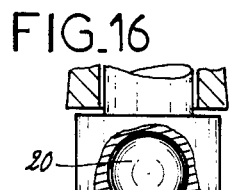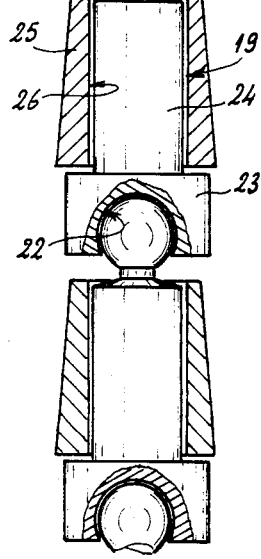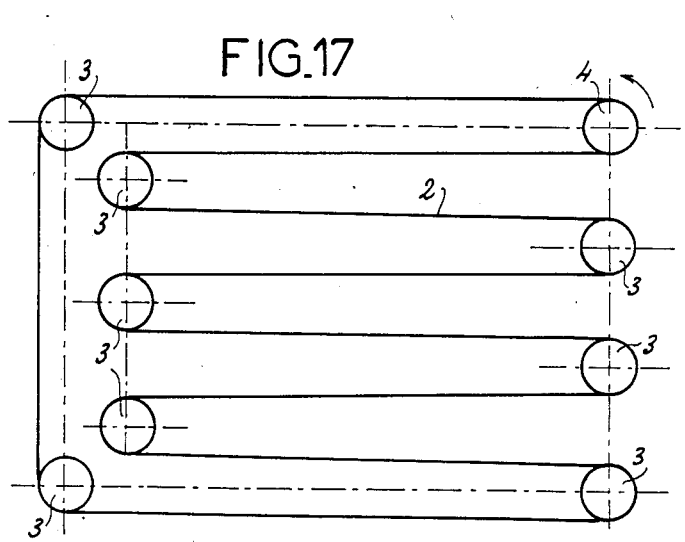

4,793,232

CUTTING APPARATUS FOR SEPARATING HARD AND SOFT MATERIALS

FIELD OF THE INVENTION

The present invention relates to a cutting apparatus for cutting apart two materials of different hardness. More particularly this invention concerns a cutter used to separate meat, fat, or the like from bone, cartilage, or the like in a meat-processing plant.

BACKGROUND OF THE INVENTION

In a meat-packing plant it is necessary to efficiently cut meat and the like soft material from bone, cartilage, and the like hard material. Obviously it is necessary to remove as much of the softer material as possible while leaving all of the harder material behind.

The standard tool for doing this is a knife which, if sufficiently sharp, can be guided along, for instance, the bone for a very clean cut. If, however, the knife is dull or the worker is not sufficiently skilled, meat will be left behind, an obviously undesirable waste. On the other hand if the knife is very sharp it is possible for even a skilled worker to cut into the bone or other harder material chips of which will, therefore, become mixed with the meat.

If the standard butcher's bandsaw is used for this operation the likelihood of getting hard material mixed in with the soft material is even greater, as such a saw can cut through bone or the like virtually as easily as it cuts through meat or fat, so that although the cutting operation is very smooth and easy, the likelihood of contaminating the cut-off soft material with the hard material is greatly increased. The use of such a power tool also requires a high degree of skill from the worker.

OBJECTS OF THE INVENTION

It is therefore an object of the present invention to provide an improved cutting apparatus for cutting soft material (e.g. meat) off hard material (e.g. bone).

Another object is the provision of such a cutting apparatus which overcomes the above-given disadvantages, that is which is easy to use, even for an unskilled worker, but that surely cuts at the interface between the hard and the soft material without cutting into the hard material.

SUMMARY OF THE INVENTION

An apparatus for cutting a soft material, such as meat, from a hard material, such as bone, according to the invention has a chain formed of a succession of alternating cutting and coupling links extending along a longitudinal line. The cutting links are of generally polygonal cross-sectional shape and have corners forming longitudinally extending sharp cutting edges spaced a predetermined maximum transverse distance from the line. In addition the coupling links are of a predetermined maximum radial dimension from the line shorter than the distance such that the cutting edges project transversely beyond the coupling links and the cutting links are rotatable in the chain about the line. This chain is advanced in a longitudinal direction parallel to the line.

Thus with the system of this invention the cutting links with naturally pivot to lie flat on the hard material and slide therealong, neatly cutting along the hard/soft interface. To this end the alternation can be a simple one-on-one setup, that is with one coupling link, then one cutting line, and so on, or several of either of the links can alternate with several or one of the other links.

According to another feature of this invention the coupling links are rotatable in the chain about the line also. In addition each cutting link has relative to the direction a leading end and a trailing end and is of the same cross-sectional shape and size therebetween. It is also possible for the cutting links to be of increasing cross-sectional size from the former to the latter. Alternately each cutting link can be tapered in the direction at the leading end. On the other hand each coupling link has relative to the direction a leading end and a trailing end and is of the same cross-sectional shape and size therebetween, or the coupling links can be balls.

The links of the chain of the apparatus of this invention form a passage extending along and centered on the line and the chain also has a flexible and relatively inextensible element extending along the line through the passage. This element has a pair of ends and is provided with a coupling body interconnecting same so that the element is endless. The coupling body has a central passage of a cross-sectional area equal generally to twice the cross-sectional area of the flexible element. These element ends are enlarged and cannot pull out of the coupling-body passage.

It is also possible according to this invention for each coupling link to have relative to the direcion a leading end and a trailing end, one of which is formed as a ball and the other of which is formed as a recess complementary to the ball and swivelably receiving the ball of the adjacent coupling link.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIG. 1 is a small-scale largely schematic view illustrating the apparatus of this invention;

FIG. 2 is a large-scale end sectional view of the apparatus at work;

FIG. 3 is a larger-scale view of the detail indicated at III in FIG. 2;

FIG. 4 is a large-scale side view of a first embodiment of the chain according to this invention;

FIG. 5 is a larger-scale cross section taken along line V—V of FIG. 4;

FIG. 6 is a large-scale side view of a second embodiment of the chain according to this invention;

FIG. 7 is a section taken along line VII—VII of FIG. 6;

FIG. 8 is a large-scale side view of a third embodiment of the chain according to this invention;

FIG. 9 is a larger-scale cross section taken along line VIII—VIII of FIG. 8;

FIG. 10 is a large-scale side view of a fourth embodiment of the chain according to this invention;

FIG. 11 is a larger-scale cross section taken along line XI—XI of FIG. 10;

FIGS. 12, 13, and 14 are end sectional views of fifth, sixth, and seventh embodiments of the cutting links of the chain according to the invention;

FIG. 15 is a large-scale longitudinal section through another detail of he chain of this invention;

FIG. 16 is a mainly longitudinal section through yet another chain according to this invention; and FIG. 17 is a view like FIG. 1 but showing another chaim setup in accordance with the invention.

SPECIFIC DESCRIPTION

As seen in FIG. 1 the system of this invention comprises at its simplest a chain 2 that is moved by drive means formed by pulleys 3 and 4 in a direction D and that is held under tension by a roller 5 under the force of a spring 6. This chain 2 is comprised as described below of cutting links 8 and coupling links 9 adapted to move as seen in FIG. 2 at the interface 7 between bone 11 and meat 16, here of a turkey breast.

As seen in FIGS. 4 and 5 the coupling links 8 have a cross section that is that of an equilateral triangle, having flat planar faces or sides 10 and 60° corners 12 forming sharp cutting edges. The coupling links 9 are of cylindrically tubular shape, and their outer diameter here is smaller than the distance from the axis A or centerline of the chain 2 to the closest parts of the faces 10. The entire chain 2 is held together by a flexible element 13, a multiwire cable, that passes loosely through cylindrical passages formed in the links 8 and 9 so that these links 8 and 9 can pivot freely about their center axes A which lie on a line defined by this cable 13.

Thus when the chain 2 is pressed transversely in one direction against the bone 11 and this bone 11 is moved in another perpendicular transverse direction, the cutting links 8 that move in the direction D perpendicular to both of these transverse directions will flatten themselves naturally on the bone 11. The result will be a natural gliding of the chain 2 over the bone 11 to automatically move along the interface 7 and separate meat from bone.

The system of FIGS. 6 and 7 has cutting links 8a that are identical to those of FIGS. 4 and 5 except that the leading ends are tapered at 17. This facilitates entry of the cutting links 8 into the material being cut.

In FIGS. 8 and 9 cutting links 8b are identical again to those of FIGS. 4 and 5 except that instead of being of unchanging cross-sectional shape they are of increasing size from their leading upstream ends (to the left in FIG. 8) to their trailing ends (right in FIG. 8). Once again, this construction facilitates entry of the cutting links into and cutting of them through the material being cut. In addition FIG. 8 illustrates how the loose fit of the cable 13 in the links 8b allows them to cant somewhat and align at the leading ends of their cutting edges 12 with the outer surface of the cylindrical coupling links 9, thereby assuring smooth entry of these cutting edges 12 into the meat.

The arrangement of FIGS. 10 and 11 is identical to that of FIGS. 8 and 9, except that the coupling links 9a are spherical rather than cylindrically tubular. It should be pointed out here that more than one such coupling link can be between consecutive cutting links, or vice versa.

FIG. 12 shows a cutting element 8c similar to that of FIG. 5, but with concave faces 10a, and FIG. 13 shows convex faces 10b. Similarly FIG. 14 shows a square-section element 18 with concave faces. Obviously, five sides or more are possible, although the larger the area of the flat faces the better the self-aligning effect, and the use of concave or convex shape is dependent on workpiece. For instance when cutting between two relatively soft materials, as for instance fat and meat, the convex shape can be better, but when virtual scraping of a very hard material is needed the concave shape is indicated.

In FIG. 15 the cable 13 has ends 15 that are provided with gobs of solder and that extend through a sleeve 14 that has a passage whose cross-sectional area is equal to about twice that of the cable 13. Thus this element 14 joins the two ends and the enlarged ends 15 will be unable to pull through it. Of course the solder is emplaced after the ends 15 are passed through the coupling 14.

FIG. 16 shows a system wherein each coupling link 24 has at one end a ball 20 and at the opposite end a spherical socket 22. Furthermore each coupling link 24 is formed with a cylindrical stem 19 and with an enlarged trailing end portion 23. A cutting link 25 is formed with a passage 26 through which the stem 19 extends loosely so that the links 24 and 25 are relatively rotatable. This link 25 is of the shape shown in FIGS. 8 and 10, although of course any of the other illustrated external shapes is also possible.

FIG. 17 show a plurality of pulleys 3 so that the chain 2 passes in parallel stretches and can, therefore, produce slices. Such an arrangement is extremely useful in producing slices of meat directly from the animal, rather than having to cut off the meat and then slice it.

It is also of course possible for the chain 2 to be moved back and forth, reciprocated through a short stroke, or even vibrated. In any case it must have some component of motion in the longitudinal direction of the chain.

We claim:

1. An apparatus for cutting a soft material, such as meat, from a hard material, such as bone, the apparatus comprising:

a chain formed of a succession of alternating cutting and coupling links extending along a longitudinal line, the cutting links being of generally polygonal cross-sectional shape and having corners forming longitudinally extending sharp cutting edges spaced a predetermined maximum transverse distance from the line, the coupling links being of a predetermined maximum radial dimension from the line shorter than the distance such that the cutting edges project transversely beyond the coupling links, the cutting links being freely rotatable in the chain about the line relative to one another; and means for advancing the chain in a longitudinal direction parallel to the line, whereby surfaces of the cutting links between said corners lie substantially flat against said hard material during cutting.

2. The cutting apparatus defined in claim 1 wherein the coupling links are rotatable in the chain about the line also.

3. The cutting apparatus defined in claim 1 wherein each cutting link has relative to the direction a leading end and a trailing end and is of the same cross-sectional shape and size therebetween.

4. The cutting apparatus defined in claim 1 wherein each cutting link has relative to the direction a leading end and a trailing end and is of increasing cross-sectional size from the former to the latter.

5. The cutting apparatus defined in claim 1 wherein each cutting link has relative to the direction a leading end and a trailing end and is tapered in the direction at the leading end.

6. The cutting apparatus defined in claim 1 wherein each coupling link has relative to the direction a leading end and a trailing end and is of the same cross-sectional shape and size therebetween.

7. The cutting apparatus defined in claim 1 wherein the coupling links are balls.

8. The cutting apparatus defined in claim 1 wherein the links form a passage extending along and centered on the line and the chain further comprises a flexible and relatively inextensible element extending along the line through the passage.

9. The cutting apparatus defined in claim 1 wherein each coupling link has relative to the direction a leading end and a trailing end, one of which is formed as a ball and the other of which is formed as a recess complementary to the ball and swivelably receiving the ball of the adjacent coupling link.

10. An apparatus for cutting a soft material, such as meat, from a hard material, such as bone, the apparatus comprising:
a chain formed of
a flexible and relatively inextensible strand extending along and defining a line,
a succession of cutting links
extending along the longitudinal line,
formed on the line with longitudinal passages through which the strand extends with play such that the cutting links can rotate freely on the strand about the line,
of generally polygonal cross-sectional shape, and
having corners forming longitudinally extending sharp cutting edges spaced a predetermined maximum transverse distance from the line, and
a succession of coupling links
alternating with the cutting links,
formed on the line with longitudinal passages through which the strand extends,
of a predetermined maximum radial dimension from the line shorter than the distance such that the cutting edges project transversely beyond the coupling links; and
means for advancing the chain in a longitudinal direction parallel to the line, whereby surfaces of the cutting links between said corners lie substantially flat against said hard material during cutting.

11. An apparatus for cutting a soft material, such as meat, from a hard material, such as bone, the apparatus comprising:
a chain formed of
a flexible and relatively inextensible strand extending along and defining a line,
a succession of cutting links
extending along the longitudinal line,
formed on the line with longitudinal passages through which the strand extends with play such that the cutting links can rotate freely on the strand about the line,
of generally polygonal cross-sectional shape, and
having corners forming longitudinally extending sharp cutting edges spaced a predetermined maximum transverse distance from the line, and
a succession of coupling links
alternating with the cutting links,
formed on the line with longitudinal passages through which the strand extends with play such that the coupling links can rotate freely on the strand about the line independently of the cutting links,
of a predetermined maximum radial dimension from the line shorter than the distance such that the cutting edges project transversely beyond the coupling links; and
means for advancing the chain in a longitudinal direction parallel to the line, whereby surfaces of the cutting links between said corners lie substantially flat against said hard material during cutting.

* * * * *